United States Patent
Choi et al.

(10) Patent No.: US 12,486,435 B2
(45) Date of Patent: Dec. 2, 2025

(54) ADHESIVE FILM AND OPTICAL DEVICE INCLUDING THE SAME

(71) Applicant: LG Display Co., Ltd., Seoul (KR)

(72) Inventors: Wonjin Choi, Seoul (KR); Junghan Kim, Seoul (KR); Geesung Chae, Incheon (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 17/578,405

(22) Filed: Jan. 18, 2022

(65) Prior Publication Data

US 2022/0135724 A1  May 5, 2022

Related U.S. Application Data

(62) Division of application No. 16/135,228, filed on Sep. 19, 2018, now Pat. No. 11,267,921.

(30) Foreign Application Priority Data

Nov. 16, 2017  (KR) ........................ 10-2017-0153353

(51) Int. Cl.
*C09J 133/10* (2006.01)
*C08K 5/095* (2006.01)
(Continued)

(52) U.S. Cl.
CPC ............. *C09J 133/10* (2013.01); *C08K 5/095* (2013.01); *C08K 5/101* (2013.01); *C08K 5/103* (2013.01); *C08K 5/11* (2013.01); *C08K 5/132* (2013.01); *C09J 4/06* (2013.01); *C09J 7/10* (2018.01); *C09J 7/40* (2018.01); *C09J 133/066* (2013.01); *C09J 133/12* (2013.01); *C09J 133/16* (2013.01); *G02F 1/133528* (2013.01);
(Continued)

(58) Field of Classification Search
None
See application file for complete search history.

(56) References Cited

U.S. PATENT DOCUMENTS 5,187,007 A  2/1993  Ebe et al.
6,150,024 A  11/2000  Dhoot et al.
(Continued)

FOREIGN PATENT DOCUMENTS

| CN | 1993439 A | 7/2007 |
|---|---|---|
| CN | 101511957 A | 8/2009 |

(Continued)

OTHER PUBLICATIONS

Machine translation of KR 20150118624A (Year: 2015).*
(Continued)

*Primary Examiner* — Frank D Ducheneaux
(74) *Attorney, Agent, or Firm* — Morgan, Lewis & Bockius LLP

(57) ABSTRACT

An adhesive film includes an upper protective layer, a lower protective layer, and an adhesive layer between the upper protective layer and the lower protective layer. The adhesive layer includes a first adhesive layer and a second adhesive layer on the first adhesive layer. The first adhesive layer includes an acrylic resin, a photoinitiator, and a monofunctional monomer. The second adhesive layer includes an acrylic resin, a photoinitiator, and a multifunctional monomer.

6 Claims, 5 Drawing Sheets

(51) Int. Cl.
*C08K 5/101* (2006.01)
*C08K 5/103* (2006.01)
*C08K 5/11* (2006.01)
*C08K 5/132* (2006.01)
*C09J 4/06* (2006.01)
*C09J 7/10* (2018.01)
*C09J 7/40* (2018.01)
*C09J 133/06* (2006.01)
*C09J 133/12* (2006.01)
*C09J 133/16* (2006.01)
*G02F 1/1335* (2006.01)

(52) U.S. Cl.
CPC .... *C09J 2203/318* (2013.01); *C09J 2301/208* (2020.08); *C09J 2301/312* (2020.08); *C09J 2301/408* (2020.08); *C09J 2301/416* (2020.08); *C09J 2433/00* (2013.01)

(56) References Cited

U.S. PATENT DOCUMENTS

| | | | |
|---|---|---|---|
| 9,650,547 B2 * | 5/2017 | Shigetomi | B32B 7/12 |
| 9,850,408 B2 | 12/2017 | Yoon et al. | |
| 2005/0192392 A1 | 9/2005 | Kim et al. | |
| 2006/0029799 A1 | 2/2006 | Sebastian et al. | |
| 2011/0003135 A1 | 1/2011 | Hirao et al. | |
| 2011/0014410 A1 | 1/2011 | Kishioka et al. | |
| 2013/0084459 A1 | 4/2013 | Larson et al. | |
| 2016/0002501 A1 | 1/2016 | Niiyama et al. | |
| 2016/0208148 A1 * | 7/2016 | Niimi | C09J 4/06 |

FOREIGN PATENT DOCUMENTS

| | | | | |
|---|---|---|---|---|
| CN | 101955738 A | | 1/2011 | |
| JP | 2016-017119 A | | 2/2016 | |
| KR | 10-2013-0139533 A | | 12/2013 | |
| KR | 2015118624 A | * | 10/2015 | B22F 3/08 |
| WO | 2015/046884 A1 | | 4/2015 | |

OTHER PUBLICATIONS

Office Action dated Oct. 27, 2020, issued in corresponding Chinese Patent Application No. 201811106166.6.
Notice of Decision of Granting Patent Right dated Oct. 20, 2021, issued in corresponding Chinese Patent Application No. 201811106166.6.
Office Action dated Mar. 22, 2022, issued in counterpart Korean Patent Application No. 10-2017-0153353.
Notice of Allowance dated Sep. 23, 2022, issued in corresponding Korean Patent Application No. 10-2017-0153353.

* cited by examiner

ADHESIVE FILM AND OPTICAL DEVICE INCLUDING THE SAME

CROSS-REFERENCE TO RELATED APPLICATION(S)

This application is a divisional application of co-pending U.S. patent application Ser. No. 16/135,228, filed on Sep. 19, 2018, which issued as U.S. Pat. No. 11,267,921 B2 on Mar. 8, 2022, and which claims the benefit of and priority to Korean Patent Application No. 10-2017-0153353, filed on Nov. 16, 2017. The entirety of the above U.S. and Korean applications is hereby incorporated herein by reference as if fully set forth herein.

BACKGROUND

1. Technical Field

The present disclosure relates to an adhesive film whose upper and lower surfaces may have different adhesive strengths, and to an optical device including the same.

2. Related Art

Processes for producing light-emitting devices, such as display panels or touch panels, or processes for producing light-receiving devices, such as solar cells, include a process of attaching between the substrates in the panel. For attaching between the substrates in the panel, an adhesive film may be interposed between the upper substrate and the lower substrate. For example, when the substrates are optically transparent substrates, the adhesive film used for attaching between these optically transparent substrates is referred to as an "optically clear adhesive film" (hereinafter also referred to as "OCA film").

This OCA film may be applied either to light-emitting devices, such as televisions, monitors, mobile phones, tablet computers and the like, which may include a liquid crystal display (LCD) or an organic light emitting diode (OLED) display device, or to light-receiving devices, such as solar cells.

The OCA film may be an adhesive film capable of high light transmittance, and may adhere to the surface of an adherend, which is an upper member or a lower member, under low pressure. In addition, the OCA film has such cohesive and elastic properties that it may strongly adhere to an adherend. The OCA film may also be easily peeled off without contaminating the surface of the adherend. However, due to different adhesive strengths between the upper member and the OCA film, or between the lower member and the OCA film, there is a problem in that damage may be caused to the upper member or the lower member attached to the OCA film.

SUMMARY

Accordingly, embodiments of the present disclosure are directed to an adhesive film and an optical device using the same that substantially obviate one or more of the problems due to limitations and disadvantages of the related art.

An object of the present disclosure is to provide an adhesive film whose upper and lower surfaces may have different adhesive strengths.

Another object of the present disclosure is to provide an optical device including the adhesive film.

Additional features and advantages will be set forth in the description that follows, and in part will be apparent from the description, or may be learned by practice of the inventive concepts. The objectives and other advantages of the disclosure will be realized and attained by the structure particularly pointed out in the written description and claims hereof as well as the appended drawings.

To achieve these features and aspects of the disclosure, as embodied and broadly described, an adhesive film includes an upper protective layer; a lower protective layer; and an adhesive layer between the upper protective layer and the lower protective layer, wherein the adhesive layer includes an acrylic resin, a photoinitiator, and a fluorinated monomer, and wherein the fluorinated monomer includes an amount of 0.1 parts by weight or more based on 100 parts by weight of the acrylic resin.

In another aspect, an adhesive film includes an upper protective layer; a lower protective layer; and an adhesive layer between the upper protective layer and the lower protective layer, wherein the adhesive layer includes a first adhesive layer and a second adhesive layer on the first adhesive layer, and wherein the first adhesive layer includes an acrylic resin, a photoinitiator, and a monofunctional monomer, and the second adhesive layer comprises an acrylic resin, a photoinitiator, and a multifunctional monomer.

In another aspect, an optical device includes a lower device; an upper device; and an adhesive layer between the upper device and the upper device, wherein the adhesive layer includes an acrylic resin, a photoinitiator, and a fluorinated monomer, and wherein the fluorinated monomer includes an amount of 0.1 parts by weight or more based on 100 parts by weight of the acrylic resin.

In another aspect, an optical device includes a lower device; an upper device; and an adhesive layer between the upper device and the lower device, wherein the adhesive layer includes a first adhesive layer adhered to the lower device, and a second adhesive layer on the first adhesive layer and adhered to the upper device, and wherein at least one of the first adhesive layer and the second adhesive layer includes an acrylic resin, a photoinitiator, and a monofunctional monomer, and the other one of the first adhesive layer and the second adhesive layer includes an acrylic resin, a photoinitiator, and a multifunctional monomer.

Other systems, methods, features, and advantages will be, or will become apparent to one with skill in the art upon examination of the following figures and detailed description. It is intended that all such additional systems, methods, features, and advantages be included within this description, be within the scope of the present disclosure, and be protected by the following claims. Nothing in this section should be taken as a limitation on those claims.

Further aspects and advantages are discussed below in conjunction with example embodiments of the disclosure.

It is to be understood that both the foregoing general description and the following detailed description are exemplary and explanatory, and are intended to provide further explanation of the disclosure as claimed.

BRIEF DESCRIPTION OF THE DRAWINGS

The accompanying drawings, which are included to provide a further understanding of the disclosure and are incorporated in and constitute a part of this specification, illustrate embodiments of the disclosure and together with the description serve to explain the principles of the disclosure. In the drawings.

DETAILED DESCRIPTION

Figure 1:
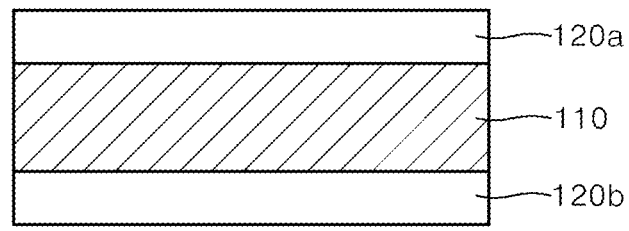
FIG. 1 is a cross-sectional view of an adhesive film.

Reference will now be made in detail to embodiments of the present disclosure, examples of which may be illustrated in the accompanying drawings.

The progression of processing steps and/or operations described is an example; however, the sequence of steps and/or operations is not limited to that set forth herein and may be changed as is known in the art or as apparent to those skilled in the art, with the exception of steps and/or operations necessarily occurring in a particular order. Like reference numerals designate like elements throughout. Names of the respective elements used in the following explanations are selected only for convenience of writing the specification and may thus be different from those used in actual products.

Advantages and features of the present disclosure, and implementation methods thereof will be clarified through following example embodiments described with reference to the accompanying drawings. The present disclosure may, however, be embodied in different forms and should not be construed as limited to the embodiments set forth herein. Rather, these embodiments are provided so that this disclosure may be sufficiently thorough and complete to assist those skilled in the art to fully understand the scope of the present disclosure. Further, the present disclosure is only defined by scopes of claims.

A shape, a size, a ratio, an angle, and a number or the like disclosed in the drawings for describing embodiments of the present disclosure is merely an example. Thus, the present disclosure is not limited to the illustrated details. Like reference numerals refer to like elements throughout. In the following description, when the detailed description of a relevant known function or configuration is determined to unnecessarily obscure an important point of the present disclosure, the detailed description of such known function or configuration may be omitted. In a case where terms "comprise," "have," and "include" described in the present specification are used, another part may be added unless a more limiting term, such as "only," is used. The terms of a singular form may include plural forms unless referred to the contrary.

In construing an element, the element is construed as including an error or tolerance range even where no explicit description of such an error or tolerance range.

In describing a position relationship, when a position relationship between two parts is described as, for example, "on," "over," "under," or "next," one or more other parts may be disposed between two parts unless a more limiting term, such as "just" or "direct(ly)," is used.

In the specification, "disposed on ~" may not only mean "any portion is disposed directly on another portion while being in contact with the second portion," but also mean "any portion is disposed on another portion while it is not in contact with the second portion or a third portion is interposed therebetween."

In describing a time relationship, when the temporal order is described as, for example, "after," "subsequent," "next," or "before," a case which is not continuous may be included unless a more limiting term, such as "just," "immediate(ly)," or "direct(ly)," is used.

It will be understood that, although the terms "first," "second," etc., may be used herein to describe various elements, these elements should not be limited by these terms as they are not used to define a particular order. These terms are used only to distinguish one element from another. For example, a first element could be termed a second element, and, similarly, a second element could be termed a first element, without departing from the scope of the present disclosure.

In describing elements of the present disclosure, the terms like "first," "second," "A," "B," "(a)," and "(b)" may be used. These terms are merely for differentiating one element from another element, and the essence, sequence, order, or number of a corresponding element should not be limited by the terms. Also, when an element or layer is described as being "connected," "coupled," or "adhered" to another element or layer, the element or layer can not only be directly connected or adhered to that other element or layer, but also be indirectly connected or adhered to the other element or layer with one or more intervening elements or layers "disposed" between the elements or layers, unless otherwise specified.

The term "at least one" should be understood as including any and all combinations of one or more of the associated listed items. For example, the meaning of "at least one of a first item, a second item, and a third item" encompasses the combination of all items proposed from two or more of the first item, the second item, and the third item as well as the first item, the second item, or the third item.

In the description of embodiments, when a structure is described as being positioned "on or above" or "under or below" another structure, this description should be construed as including a case in which the structures contact each other as well as a case in which a third structure is disposed therebetween. The size and thickness of each element shown in the drawings are given merely for the convenience of description, and embodiments of the present disclosure are not limited thereto, unless otherwise specified.

Features of various embodiments of the present disclosure may be partially or overall coupled to or combined with each other, and may be variously inter-operated with each other and driven technically as those skilled in the art can sufficiently understand. Embodiments of the present disclosure may be carried out independently from each other, or may be carried out together in a co-dependent relationship.

Hereinafter, various embodiments of an adhesive film and an optical device including the same will be described with reference to the accompanying drawings.

The adhesive film will now be described by way of example with reference to FIG. 1.

FIG. 1 is a cross-sectional view of an adhesive film.

With reference to FIG. 1, the adhesive film includes an adhesive layer 110 and has a structure in which protective layers 120a and 120b are disposed on the upper and lower surfaces of the adhesive layer 110. The adhesive layer 110 includes acryl-based resin, urethane-based resin or the like as a main component. Each of the upper and lower protective layers 120a and 120b includes a film formed of a material such as polyethylene terephthalate (PET), polypropylene (PP), or the like. Between the adhesive layer 110 and the upper protective layer 120a, or between the adhesive layer 110 and the lower protective layer 120b, a silicone adhesive having a lower adhesive strength than that of an acrylic adhesive may be applied. The thickness of the silicone adhesive determines the adhesive strength between the adhesive layer 110 and the upper protective layer 120a, and the adhesive strength between the adhesive layer 110 and the lower protective layer 120b.

Figure 2:
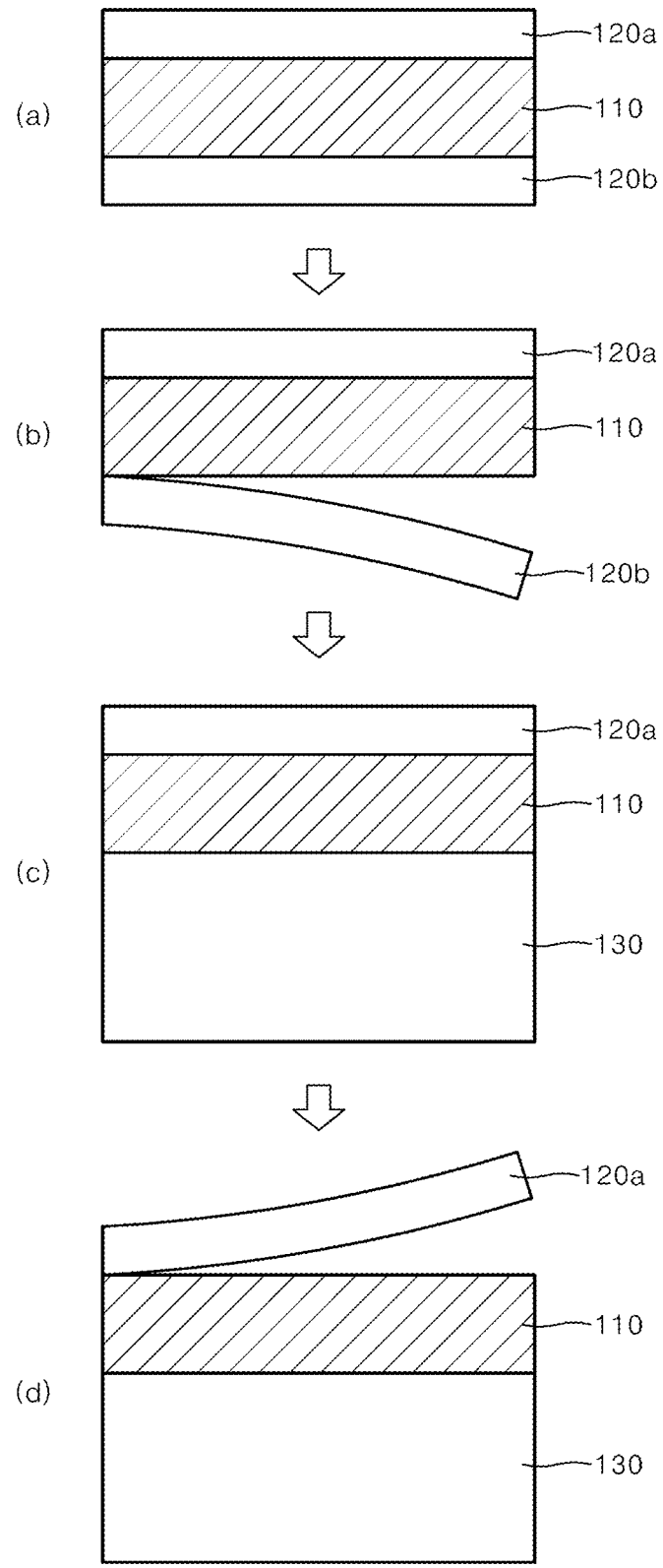
FIG. 2 illustrates an example process of producing an optical device using an adhesive film.

FIG. 2 illustrates an example manufacturing process of an optical device using an adhesive film.

As illustrated in part (a) of FIG. 2, protective layers 120a and 120b are disposed on the upper and lower surfaces of the adhesive layer 110.

As illustrated in part (b) of FIG. 2, a lower protective layer 120b is first peeled off from the adhesive layer 110 in order to attach a lower device to the adhesive layer 110 of an adhesive film.

Then, as illustrated in part (c) of FIG. 2, a lower device 130 is attached to the adhesive layer's lower surface exposed by peeling off of the lower protective layer 120b.

Next, as illustrated in part (d) of FIG. 2, an upper protective layer 120a is peeled off to expose the upper surface of the adhesive layer 110 in order to attach an upper device to the adhesive layer.

Thereafter, an upper device is attached to the upper surface of the adhesive layer.

When the upper device is to be attached to the adhesive layer after the lower device 130 is first attached to the adhesive layer, the adhesive strength between the upper protective layer and the adhesive layer is greater than the adhesive strength between the lower protective layer and the adhesive layer. This is because the upper protective layer 120a needs to maintain its adhesion to the adhesive layer 110 when the lower protective layer 120b is peeled off from the adhesive layer 110 to attach the lower device 130 to the adhesive layer 110.

Due to the high adhesive strength between the upper protective layer 120a and the adhesive layer 110, a lot of force may be required to peel off the upper protective layer 120a from the adhesive layer 110. For this reason, there may be a problem in that damage is caused to the lower device 130 already attached to the adhesive layer 110.

If the adhesive strength between the upper protective layer and the adhesive layer is reduced to solve this problem, a problem may arise in that the upper protective layer 120a is also peeled off when the lower protective layer 120b is peeled off.

To solve this problem, the following two conditions may be satisfied. First, during peeling off of the lower protective layer 120b, a high adhesive strength between the upper protective layer 120a and the adhesive layer 110 should be maintained such that the upper protective layer 120a is not be peeled off. Second, during peeling off of the upper protective layer 120a, the adhesive strength between the upper protective layer 120a and the adhesive layer 110 should be reduced so that the upper protective layer 120a is be easily peeled off.

Therefore, an adhesive film may be provided, which may maintain a high adhesive strength between the lower protective layer and adhesive layer during peeling off of the lower protective layer, and which may make it possible to reduce the adhesive strength between the upper protective layer and adhesive layer during peeling off of the upper protective layer.

An adhesive film may be configured such that a high adhesive strength between the upper protective film and adhesive layer of the adhesive film may be maintained during peeling off of a lower protective layer from the adhesive film, and such that the adhesive strength between the upper protective layer and adhesive layer of the adhesive film may be reduced during peeling off of the upper protective layer from the adhesive film, thereby reducing damage to a lower device, which is already attached to the adhesive layer, in the process of peeling off the upper protective layer.

An adhesive film including an adhesive layer has a specific composition configured such that the adhesive strength between the upper protective layer and the adhesive layer may be reduced by UV irradiation, which is performed to increase the adhesive strength between the adhesive layer of the adhesive film and the lower device after attaching therebetween.

As illustrated in FIG. 1, an adhesive film according to an example embodiment of the present disclosure includes an adhesive layer 110, an upper protective layer 120a disposed on the adhesive layer 110, and a lower protective layer 120b disposed under the adhesive layer 110.

The adhesive strength between the upper protective layer 120a and the adhesive layer 110 may differ from the adhesive strength between the lower protective layer 120b and the adhesive layer 110. For example, in a case where an upper device is attached to the adhesive layer 110 of the adhesive film after a lower device 130 is first attached to the adhesive layer 110, the upper protective layer 120a may need to retain its adhesion to the adhesive layer when the lower protective layer 120b is peeled off to attach the lower device 130 to the adhesive layer 110 of the adhesive film. For this reason, in this case, the adhesive strength between the upper protective layer and adhesive layer of the adhesive film is higher than the adhesive strength between the lower protective layer and adhesive layer 110 of the adhesive film.

In a case where the adhesive strength between the lower protective layer 120b and the adhesive layer 110 is lower than the adhesive strength between the upper protective layer 120a and the adhesive layer 110, the lower protective layer 120b is first peeled off, and then a lower device 130 is attached to the surface of the adhesive layer 110, which has been exposed by peeling off of the lower protective layer 120b. Alternatively, in a case where the adhesive strength between the upper protective layer 120a and the adhesive layer 110 is lower than the adhesive strength between the lower protective layer 120b and the adhesive layer 110, the upper protective layer 120a is first peeled off, and then an upper device is attached to the surface of the adhesive layer 110, which has been exposed by peeling off of the upper protective layer 120a.

In this initial state, the adhesive strength between the upper protective layer 120a and the adhesive layer 110 and the adhesive strength between the lower protective layer 120b and the adhesive layer 110 may be determined not only by the adhesive strength of the adhesive layer, but also by the thickness of a silicone adhesive or the like applied to one surface of the upper protective layer 120a (which is a surface bonded or attached to the adhesive layer) and/or one surface of the lower protective layer 120b (which is a surface bonded or attached to the adhesive layer). In an example, the thickness of the silicone adhesive may be about 20 to 100 μm. As the thickness of the silicone adhesive increases, the adhesive strength between the silicone adhesive and the adhesive layer increases. For example, where an approximately 60 μm thick silicone adhesive is applied to one surface of the upper protective layer 120a, and an approximately 30 μm thick silicone adhesive is applied to one surface of the lower protective layer 120b, the adhesive strength between the upper protective layer 120a and the adhesive layer 110 is greater than the adhesive strength between the lower protective layer 120b and the adhesive layer 110.

The adhesive film according to the example embodiment of the present disclosure includes a predetermined amount of a fluorinated monomer in the adhesive layer 110. This fluorinated monomer reduces the adhesive strength between the upper protective layer and the adhesive layer by UV irradiation according to the following principle.

Figure 3:
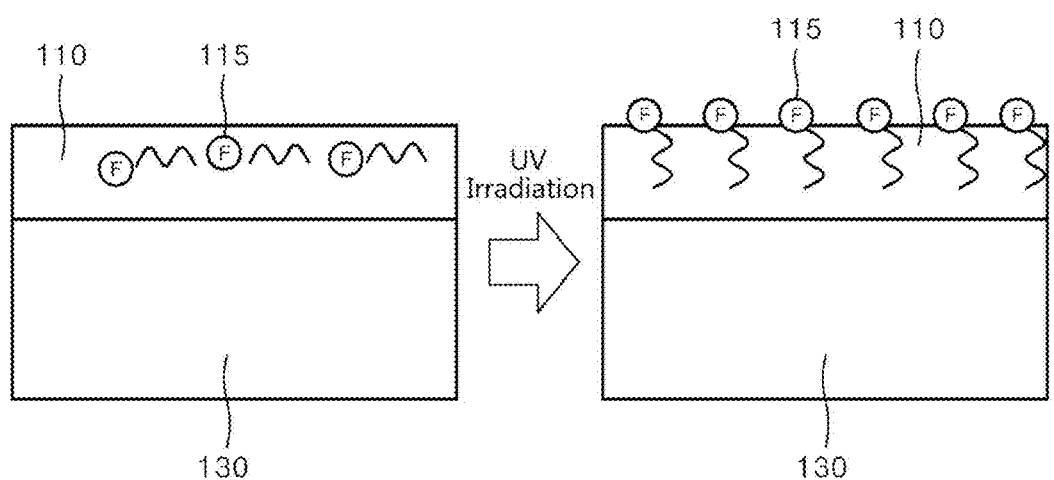
FIG. 3 illustrates an example in which the position of a fluorinated monomer is changed when an adhesive film according to an example embodiment of the present disclosure is irradiated with UV light.

As shown in FIG. 3, when a lower device 130 is attached to the adhesive layer 110, and followed by UV irradiation to increase the adhesive strength therebetween, the fluorinated monomer may float toward the upper surface of the adhesive layer 110, so that the surface energy of the upper surface of the adhesive layer 110 may be reduced. As the surface energy of the adhesive layer 110 is reduced, the adhesive strength between the adhesive layer 100 and the protective layer 120a may be reduced. For UV irradiation, a long wavelength may be used rather than a short wavelength, in order to reduce the effect of UV irradiation on the lower device 130. In an example, UV irradiation may be performed for curing at 1 kW for 10 seconds or less, but embodiments are not limited thereto. Also, before UV irradiation, heating may be performed. For example, heating may be performed at a temperature of 50° C. to 60° C. for 1 to 3 minutes. When heating is performed, the viscosity of the adhesive layer 110 may be reduced, and thus the fluorinated monomer 115 may float to the upper surface. Due to the reduced surface energy of the adhesive layer 110, the protective layer 120a may be peeled off with a relatively small force or pressure, and thus damage to the lower device 130 attached to the lower surface of the adhesive layer 110 may be reduced. Furthermore, as the fluorinated monomer 115 is floated toward the upper surface by UV irradiation, the fluorinated monomer may not be substantially present in the lower surface, so that the surface energy of the lower surface will not be substantially reduced. Thus, the adhesive strength between the adhesive layer 110 and the lower device 130 may be maintained.

The adhesive layer 110 may include an acrylic resin, a photoinitiator, and a fluorinated monomer.

The acrylic resin that is used in an example embodiment may be an acrylic resin used in acrylic adhesives. For example, the acrylic resin may be a homopolymer of methyl methacrylate, a copolymer of methyl acrylate and methyl methacrylate, or a copolymer of methyl methacrylate and a comonomer including one or more of ethyl methacrylate, propyl methacrylate, butyl methacrylate, propyl methacrylate, phenyl methacrylate and styrene.

The photoinitiator may include one or more of benzophenone, chloroacetophenone, diethoxyacetophenone, hydroxyacetophenone, α-aminoacetophenone, 2-ethylanthraquinone (2-ETAQ) benzoin ether, benzildimethylketal, thioxanthone, 1-phenyl-2-hydroxy-2-methyl-propan-1-one, iso-butyl-benzion-ester, iso-propyl-benzoin-ester, 2,2-dimethoxy-2phenyl-acetophenone, hydroxy-cyclohexyl-phenyl, and 2-chloro-thixoanthone, but embodiments are not limited thereto.

The photoinitiator may be included in an amount of 3 to 5 parts by weight (wt %) based on 100 parts by weight (wt %) of the acrylic resin. If the content of the photoinitiator is less than 3 parts by weight, a curing reaction may hardly occur, and if the content of the photoinitiator is more than 5 parts by weight, light transmittance may be reduced.

The fluorinated monomer may be formed of one or more of: monomers having a straight-chain fluoroalkyl group such as $—CF_2CF_3$, $—CH_2(CF_2)_4H$ or the like, a branched fluoroalkyl group such as $—CH(CF_3)_2$, $—CH_2CF(CF_3)_2$, $—(CF_2O)—$, $—(CF_2CF_2O)—$ or the like, or an alicyclic fluoroalkyl group such as perfluorocyclohexyl group, a perfluorocyclopentyl group or the like. These monomers may be used alone or as a mixture of two or more. However, embodiments are not limited thereto.

The fluorinated monomer may be in an amount of 0.1 parts by weight (wt %) or more based on 100 parts by weight (which may also be referred to as 100 wt %) of the acrylic resin. If the content of the fluorinated monomer is less than 0.1 parts by weight, the effect of reducing the surface energy of the adhesive layer surface, attached to the upper protective layer, by UV irradiation, may be insufficient.

In addition, the fluorinated monomer may be included in an amount of 1.0 parts by weight or less based on 100 parts by weight of the acrylic resin. If the content of the fluorinated monomer is more than 1.0 parts by weight, the effect of reducing the adhesive strength may not be achieved, and the transparency and refractive index of the adhesive layer may be reduced as the content of the fluorinated monomer increases.

Furthermore, the adhesive layer 110 may include additives. The additives may be added in a range that does not impair the adhesive property and optical property of the adhesive layer. For example, the additives may be included in an amount of about 0.01 to 1 parts by weight based on 100 parts by weight of the acrylic resin. Examples of the additives include, but embodiments are not limited to, a crosslinking agent, a UV stabilizer, an antioxidant, a coloring agent, a reinforcing agent, a filler, and a plasticizer. Examples of the filler may include nanoparticles, but embodiments are not limited thereto.

Figure 4:
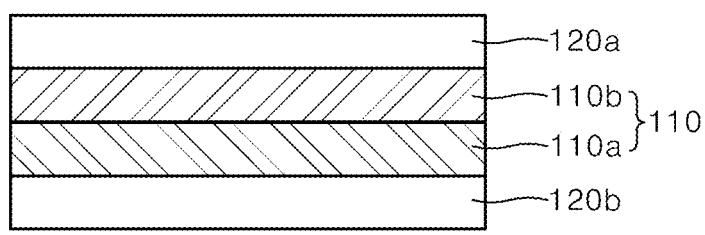
FIG. 4 is a cross-sectional view of an adhesive film according to another example embodiment of the present disclosure.

FIG. 4 is a cross-sectional view of an adhesive film according to another example embodiment of the present disclosure.

With reference to FIG. 4, the adhesive film according to another example embodiment of the present disclosure may include an adhesive layer 110, an upper protective layer 120a on the adhesive layer 110, and a lower protective layer 120b under the adhesive layer 110.

As shown in FIG. 4, the adhesive layer 110 has a multilayer structure including a first adhesive layer 110a and a second adhesive layer 110b disposed on the first adhesive layer 110a.

Like the above-described example embodiment, in an initial state, the adhesive strength between the upper protective layer 120a and the second adhesive layer 110b may differ from the adhesive strength between the lower protective layer 120b and the first adhesive layer 110a. For example, the upper protective layer 120a is attached to the second adhesive layer, and thus in an initial state, the adhesive strength between the upper protective layer 120a and the second adhesive layer 110b may be greater than the adhesive strength between the lower protective layer 120b and the first adhesive layer 110a. In this case, peeling off of the lower protective layer 120b may be firstly performed, and then a lower device or an upper device may be attached to the surface of the first adhesive layer 110a, exposed by peeling off of the lower protective layer 120b.

The adhesive layer 110 according to this example embodiment has a two-layer structure. The first adhesive layer 110a includes a monofunctional monomer whose adhesive strength may be reduced to a relatively small extent by UV irradiation or may be increased by UV irradiation, and the second adhesive layer 110b includes a multifunctional monomer whose adhesive strength is reduced to a relatively great extent compared to that of the monofunctional monomer by UV irradiation, whereby the adhesive strength between the second adhesive layer and the upper protective layer may be reduced by UV irradiation.

Accordingly, the first adhesive layer 110a may include an acrylic resin, a photoinitiator, and a monofunctional monomer, and the second adhesive layer 110b may include an acrylic resin, a photoinitiator, and a multifunctional monomer. The monofunctional monomer may be, for example, MMA (methyl methacrylate) or 2HEA (2-hydroxyethylacrylate), but embodiments are not limited thereto. In addition, the multifunctional monomer may be, for example, a tri-functional monomer such as 1,6-hexanediol diacrylate, a tetra-functional monomer such as TMPTA (trimethylolpropane triacrylate), or a penta-functional monomer such as DPHA (dipentaerythritol hexaacrylate, but embodiments are not limited thereto.

Examples of the monofunctional monomer that is included in the first adhesive layer 110a may include, but embodiments are not limited to, 2-ethylhexyl acrylate, octyldecyl acrylate, isodecyl acrylate, tridecyl methacrylate, tetrahydrofurfurylate, hydroxyethyl acrylate, hydroxyethyl methacrylate, hydroxypropyl acrylate, hydroxypropyl methacrylate, hydroxybutyl methacrylate, and the like, which may be used alone or as a mixture of two or more thereof.

The multifunctional monomer that is included in the second adhesive layer 110b may be, for example, one or more among difunctional monomers such as 1,3-butanediol diacrylate, 1,4-butanediol diacrylate, 1,6-hexanediol diacrylate, diethyleneglycol diacrylate, triethyleneglycol dimethacrylate, neopentylglycol diacrylate, ethyleneglycol dimethacrylate, tetraethyleneglycol dimethacrylate, polyethyleneglycol dimethacrylate, tripropyleneglycol diacrylate, 1,6-hexanediol diacrylate and the like, trifunctional monomers such as trimethylolpropane triacrylate, trimethylolpropane trimethacrylate, pentaerythritol triacrylate, glycidyl penta triacrylate, glycidyl penta triacrylate and the like, and tetra-functional or higher monomers such as 1,6-hexanediol diacrylate, tripropyleneglycol diacrylate, trimethylolpropane triacrylate, pentaerythritol diacrylate and the like, but embodiments are not limited thereto.

Figure 5:
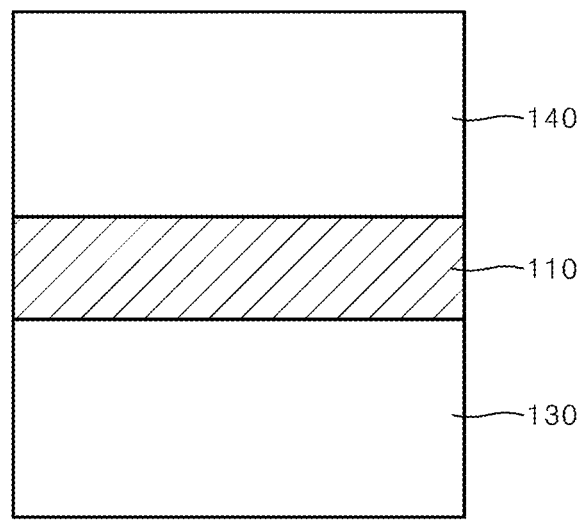
FIG. 5 illustrates an optical device according to an example embodiment of the present disclosure.

FIG. 5 illustrates an optical device according to an example embodiment of the present disclosure.

With reference to FIG. 5, the optical device may include a lower device 130, an upper device 140, and an adhesive layer 110 between the lower device 130 and the upper device 140.

The optical device may be a light-emitting device such as a TV, a monitor, a mobile phone or a tablet PC, which may include an LCD (liquid crystal display) or OLED (organic light emitting diode) display device, or a portion of the light-emitting device, or a light-receiving device such as a solar cell, or a portion of the light-receiving device.

In an example, the lower device 130 may include at least one of various substrates, such as a decorative film, a protective layer, a light-emitting element, an encapsulation substrate, a TFT substrate and the like, and the upper device 140 may include at least one of a hard coating film, an impact protective film, a polarizer, a cover window, and a touch panel.

Figure 7:
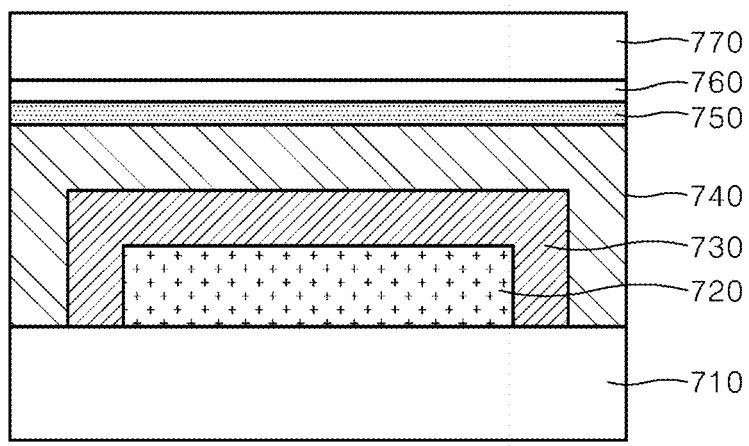
FIG. 7 illustrates an example of an optical device including an adhesive film according to the present disclosure.

However, the lower device 130 and the upper device 140 are merely respective devices disposed under the adhesive layer 110 and on the adhesive layer 110, and are not limited thereto. FIG. 7, which is described further below, shows an example of an optical device including the adhesive film according to an example embodiment.

In addition, as shown in FIG. 5, the adhesive layer 110 may include an acrylic resin, a photoinitiator, and a fluorinated monomer, wherein the fluorinated monomer may be included in an amount of 0.1 parts by weight or more, and 1.0 parts by weight or less, based on 100 parts by weight of the acrylic resin. Furthermore, the density of the fluorinated monomer in the adhesive layer 110 shown in FIG. 5 may differ in the thickness direction. For example, the fluorinated monomer is concentrated on the lower surface of the adhesive layer 110, or on the upper surface of the adhesive layer 110. For example, when UV light is irradiated in a state in which the lower device 130 is attached to the adhesive layer of the adhesive film, the fluorinated monomer may be concentrated on the upper surface due to heat caused by UV irradiation. Alternatively, when UV light is irradiated in a state in which the upper device 140 is attached to the adhesive layer of the adhesive film, the fluorinated monomer may be concentrated on the lower surface. Even though the adhesive layer including the fluorinated monomer is used, the density of the fluorinated monomer in the adhesive layer may be uniform in the thickness direction, unless UV light is irradiated during the process of attaching the adhesive film. According to example embodiments, when a predetermined amount of the fluorinated monomer as described above is added to the adhesive layer and UV light is irradiated during the process of attaching the adhesive film, the density of the fluorinated monomer in the adhesive layer may differ in the thickness direction of the adhesive layer. This is because the fluorinated monomer may be concentrated on one surface of the adhesive layer of the adhesive film due to heat generated by UV irradiation, and thus the density of the fluorinated monomer may differ in the thickness direction of the adhesive layer.

Figure 6:
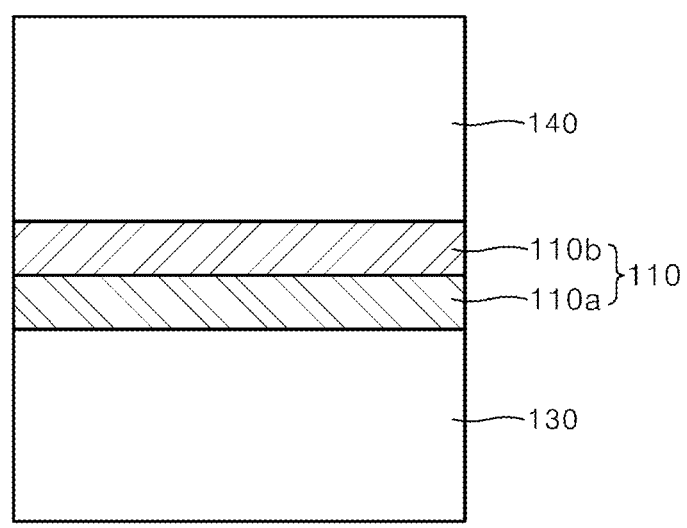
FIG. 6 illustrates an optical device according to another example embodiment of the present disclosure.

FIG. 6 illustrates an optical device according to another example embodiment of the present disclosure.

The optical device shown in FIG. 6 includes a lower device 130, an upper device 140, and an adhesive layer 110 interposed between the lower device 130 and the upper device 140. The adhesive layer 110 attributes to the adhesive film according to an example embodiment.

Accordingly, the adhesive layer 110 in FIG. 6 includes a first adhesive layer 110a and a second adhesive layer 110b. The first adhesive layer 110a is attached to a lower device 130. The second adhesive layer 110b is disposed on the first adhesive layer 110a and attached to an upper device 140.

Furthermore, the first adhesive layer 110a may include an acrylic resin, a photoinitiator, and a monofunctional monomer. The second adhesive layer 110b may include an acrylic resin, a photoinitiator, and a multifunctional monomer.

In other example embodiments, UV-curable acrylate and heat-curable epoxy resin are dissolved in a solvent. Then, the epoxy resin in the lower portion may be cured by heat, so that phase separation may be induced while the fluorine group may be floated to the upper portion, and then the upper portion may be cured by UV irradiation. Even in this configuration, the effect of allowing the upper and lower surfaces of the adhesive film to have different adhesive strengths may be obtained, like the example embodiment including two adhesive layers.

FIG. 7 shows an example of an optical device including the adhesive film according to an example embodiment. For example, FIG. 7 shows an example of a light-emitting display device including the adhesive film according to an embodiment of the present disclosure.

With reference to FIG. 7, a light-emitting display device may include: a substrate 710; a light-emitting element 720 disposed on the substrate; a protective layer 730 configured to encapsulate the light-emitting element 720 on the substrate; a polarizer 750 disposed on the protective layer 730 and configured to polarize light from the light-emitting element 720; and a cover window 770 disposed on the polarizer. The cover window 770 may protect the components in the display device from external impact.

Furthermore, the protective layer 730 and the polarizer 750 are attached to each other by a lower adhesive layer 740 (the lower adhesive layer 740 shown in FIG. 7 may also function to planarize the surface of the light-emitting display device). Furthermore, the polarizer 750 and the cover window 770 are attached to each other by an upper adhesive layer 760. In addition, a touch panel may further be provided on the protective layer 730. When the touch panel is further provided, the polarizer 750 may be disposed on the touch panel.

The above-described lower adhesive layer 740 and upper adhesive layer 760 may be an adhesive layer of an adhesive film according to an example embodiment. Furthermore, with respect to the lower adhesive layer 740, any one of the substrate 710, the light-emitting element 720, and the protective layer 730 may be a lower device, and any one of the polarizer 750 and the touch panel may be an upper device. In addition, with respect to the upper adhesive layer 760, the cover window 770 may be an upper device, and a portion ranging from the substrate 710 to the polarizer 750 may be a lower device.

Meanwhile, a display panel constituting an optical device of an example embodiment may be any one of a liquid crystal display panel, a light-emitting display panel, a touch panel, a touch panel on a liquid crystal display panel, and a touch panel on a light-emitting display panel, but embodiments are not limited thereto. In addition, examples of the light-emitting display panel include, but embodiments are not limited to, an organic light-emitting display panel and an inorganic light-emitting display panel.

In an example, the change in adhesive strength by UV irradiation was tested as a function of the content of the fluorinated monomer in the adhesive layer of the adhesive film according to an example embodiment of the present disclosure.

As an acrylic resin, an acrylic resin, including a cyclic group and synthesized from urethane acrylate (80 wt %) and methyl methacrylate (20 wt %), was used. As a photoinitiator, 2-hydroxy-2-methyl-1-phenyl-propan-1-one was used in an amount of 4 parts by weight. As a fluorinated monomer, a monomer having —($CF_2CF_2O$)— was used. Table 1 below shows the amounts of components added.

Adhesive strength was measured by a 180° (degree) peel test, and the initial adhesive strength of each sample was 17 gf/inch. As a protective layer for adhesive strength measurement, a PET film was used.

TABLE 1

| No. | Resin (parts by weight) | Amount of fluorinated monomer added (parts by weight) | Contact angle (in $H_2O$) Initial | Contact angle (in $H_2O$) After UV irradiation | Adhesive strength (gf/inch) |
|---|---|---|---|---|---|
| 1 | Acrylic resin (100) | 0.05 | 60 | 88 | 10 |
| 2 | | 0.1 | | 112 | 3 |
| 3 | | 0.4 | | 99 | 4 |
| 4 | | 0.7 | | 114 | 3 |
| 5 | | 1.0 | | 94 | 5 |
| 6 | | 1.2 | | 94 | 5 |
| 7 (Comparative Example) | | — | | — | 17 |

With reference to Table 1 above, it can be seen that, for samples 2 to 6 to which the fluorinated monomer was added in an amount of 0.1 parts by weight, the adhesive strengths of the samples were reduced by 50% or more. However, for sample 7 to which the fluorinated monomer was not added, the adhesive strength was not reduced, and for sample 1 to which the fluorinated monomer was added in an amount of less than 0.1 parts by weight, the extent of reduction in the adhesive strength was relatively small.

Thus, it can be seen that when the fluorinated monomer is added to the adhesive layer in an amount of 0.1 parts by weight or more, the adhesive strength of the adhesive layer may be reduced.

Such results can be confirmed from the change in contact angle. Surface energy may be measured by contact angle. Although all the samples had the same initial contact angle (60°), the contact angles of the samples to which the fluorinated monomer was added showed a tendency to increase. With reference to Table 1 above, it can be seen that the extent of change in the contact angle is not directly proportional to the extent of change in the adhesive strength. For example, as the contact angle is lower, the adhesive strength may be higher, and as the contact angle is higher, the adhesive strength may be lower.

The results in Table 1 above are attributable to the example embodiment shown in FIG. 3. In addition, in the other example embodiment shown in FIG. 5 and another example embodiment, the adhesive strength may also be reduced by addition of the fluorinated monomer.

The display device according to the example embodiments may be applied to mobile devices, video phones, smart watches, watch phones, wearable devices, foldable devices, rollable devices, bendable devices, flexible devices, curved devices, electronic notebooks, e-books, PMPs (portable multimedia players), PDAs (personal digital assistants), MP3 players, mobile medical devices, desktop computers, laptop computers, netbook computers, workstations, navigations, vehicle navigations, vehicle display devices, televisions, wall paper display devices, notebooks, monitors, cameras, camcorders, home appliances, and the like.

Example embodiments of the present disclosure may be described as follows.

An adhesive film according to embodiments of the present disclosure includes: an adhesive layer; an upper protective layer disposed on the adhesive layer; and a lower protective layer disposed under the adhesive layer, wherein the adhesive layer includes an acrylic resin, a photoinitiator and a fluorinated monomer, wherein the fluorinated monomer is included in an amount of 0.1 parts by weight or more based on 100 parts by weight of the acrylic resin.

According to some embodiments of the present disclosure, the fluorinated monomer may be included in an amount of 1.0 parts by weight or less based on 100 parts by weight of the acrylic resin.

According to some embodiments of the present disclosure, the photoinitiator may be included in an amount of 3 to 5 parts by weight based on 100 parts by weight of the acrylic resin.

According to some embodiments of the present disclosure, the adhesive strength between the upper protective layer and the adhesive layer may differ from the adhesive strength between the lower protective layer and the adhesive layer.

According to some embodiments of the present disclosure, the adhesive strength between the upper protective layer and the adhesive layer may be larger than the adhesive strength between the lower protective layer and the adhesive layer, and the adhesive strength between the upper protective layer and the adhesive layer may be reduced by UV irradiation.

According to some embodiments of the present disclosure, the UV irradiation may be performed at 1 kW for 10 seconds or less.

An adhesive film according to other embodiments of the present disclosure includes: an adhesive layer; an upper protective layer disposed on the adhesive layer; and a lower protective layer disposed under the adhesive layer, wherein the adhesive layer includes a first adhesive layer and a second adhesive layer disposed on the first adhesive layer, wherein the first adhesive layer includes an acrylic resin, a photoinitiator and a monofunctional monomer, and the second adhesive layer includes an acrylic resin, a photoinitiator and a multifunctional monomer.

According to some embodiments of the present disclosure, the adhesive strength between the upper protective layer and the second adhesive layer may be higher than the adhesive strength between the lower protective layer and the first protective layer.

According to some embodiments of the present disclosure, by UV irradiation, the adhesive strength of the first adhesive layer may be increased and the adhesive strength of the second adhesive layer may be reduced, or by UV irradiation, the adhesive strength of the second adhesive layer may be reduced by an extent larger than that of the adhesive strength of the first adhesive layer.

An optical device according to embodiments of the present disclosure includes: a lower device; an upper device; and an adhesive layer interposed between the upper device and the upper device, wherein the adhesive layer includes an acrylic resin, a photoinitiator and a fluorinated monomer, wherein the fluorinated monomer is included in an amount of 0.1 parts by weight or more based on 100 parts by weight of the acrylic resin.

According to some embodiments of the present disclosure, the fluorinated monomer may be included in an amount of 1.0 part by weight or less based on 100 parts by weight of the acrylic resin.

According to some embodiments of the present disclosure, the photoinitiator may be included in an amount of 3 to 5 parts by weight based on 100 parts by weight of the acrylic resin.

According to some embodiments of the present disclosure, the density of the fluorinated monomer may differ in the thickness direction of the adhesive layer.

According to some embodiments of the present disclosure, the lower device may include at least one of a substrate, a light-emitting element, and a protective layer.

According to some embodiments of the present disclosure, the upper device may include at least one of a polarizer, a cover window, and a touch panel.

An optical device according to other embodiments of the present disclosure includes: a lower device; an upper device; and an adhesive layer interposed between the upper device and the upper device, wherein the adhesive layer includes a first adhesive layer attached to the lower device, and a second adhesive layer disposed on the first adhesive layer and attached to the upper device, wherein any one of the first adhesive layer and the second adhesive layer includes an acrylic resin, a photoinitiator and a monofunctional monomer, and the other one of the first adhesive layer and the second adhesive layer includes an acrylic resin, a photoinitiator and a multifunctional monomer.

According to some embodiments of the present disclosure, the lower device may include at least one of a substrate, a light-emitting element, and a protective layer.

According to some embodiments of the present disclosure, the upper device may include at least one of a polarizer, a cover window, and a touch panel.

As described above, according to example embodiments of the present disclosure, after a lower device is attached to the adhesive layer of an adhesive film, the adhesive strength between the adhesive layer and upper protective layer of the adhesive film may be reduced by UV irradiation. Thus, in a process of peeling off the upper protective layer, which is a subsequent process, the upper protective layer may be peeled off with a small force, so that damage to the lower device attached to the adhesive layer may be reduced.

In addition, according to example embodiments of the present disclosure, a first adhesive layer includes a monofunctional monomer whose adhesive strength may be reduced to a relatively small extent by UV irradiation or may be increased by UV irradiation, and a second adhesive layer includes a multifunctional monomer whose adhesive strength is reduced to a relatively great extent by UV irradiation, whereby the adhesive strength between the second adhesive layer and the protective layer may be reduced by UV irradiation.

It will be apparent to those skilled in the art that various modifications and variations may be made in the present disclosure without departing from the technical idea or scope of the disclosure. Thus, it is intended that embodiments of the present disclosure cover the modifications and variations of the disclosure provided they come within the scope of the appended claims and their equivalents.

What is claimed is:

1. An optical device, comprising:
   a lower device;
   an upper device; and
   an adhesive layer between the upper device and the lower device,
   wherein the adhesive layer includes a first adhesive layer adhered to the lower device, and a second adhesive layer on the first adhesive layer and adhered to the upper device,
   wherein the first adhesive layer includes a first acrylic resin, a first photoinitiator, and a monofunctional monomer and is without a multifunctional monomer, and the second adhesive layer includes a second acrylic resin, a second photoinitiator, and two or more multifunctional monomers, and is without the monofunctional monomer,
   wherein, by UV irradiation, the adhesive strength of the first adhesive layer is increased and the adhesive strength of the second adhesive layer is reduced,
   wherein the first acrylic resin is a copolymer of methyl methacrylate and phenyl methacrylate, and wherein the second acrylic resin is a copolymer of comonomers, wherein one of the comonomers is phenyl methacrylate, wherein the two or more multifunctional monomers include 1,3-butanediol diacrylate and glycidyl penta triacrylate, and wherein the monofunctional monomer in the first adhesive layer is one or more of a fluorinated monomer, MMA (methyl methacrylate), and 2HEA (2-hydroxyethylacrylate).

2. The optical device of claim 1, wherein the lower device includes at least one of a substrate, a light-emitting element, and a protective layer.

3. The optical device of claim 1, wherein the upper device includes at least one of a polarizer, a cover window, and a touch panel.

4. The optical device of claim 1, wherein the lower device includes a substrate, a light-emitting element, and a protective layer.

5. The optical device of claim 4, wherein the upper device is a cover window.

6. The optical device of claim 1, wherein the monofunctional monomer in the first adhesive layer is the fluorinated monomer, MMA (methyl methacrylate), or both.

* * * * *